United States Patent [19]
Nacman et al.

[11] Patent Number: 5,826,139
[45] Date of Patent: Oct. 20, 1998

[54] METHOD AND APPARATUS FOR CONTROLLING THE SEQUENCE, SIZE AND POSITION OF AN IMAGE CONTROL PATCH

[75] Inventors: Aron Nacman, Penfield; Roger W. Budnik, Rochester; Guru B. Raj, Fairport, all of N.Y.

[73] Assignee: Xerox Corporation, Stamford, Conn.

[21] Appl. No.: 720,533

[22] Filed: Sep. 30, 1996

[51] Int. Cl.⁶ .................................................. G03G 15/00
[52] U.S. Cl. ............................................ 399/72; 347/900
[58] Field of Search .................................. 399/38, 49, 72; 347/132, 900; 358/296; 395/106, 107, 117

[56] References Cited

U.S. PATENT DOCUMENTS

| | | | |
|---|---|---|---|
| 4,949,105 | 8/1990 | Prowak | 346/154 |
| 4,999,673 | 3/1991 | Bares | 355/208 |
| 5,060,013 | 10/1991 | Spence | 399/72 |
| 5,227,270 | 7/1993 | Scheuer et al. | 430/31 |
| 5,300,983 | 4/1994 | Paxon | 355/208 |
| 5,416,563 | 5/1995 | Magde, Jr. | 355/208 |
| 5,450,165 | 9/1995 | Henderson | 399/49 |
| 5,463,455 | 10/1995 | Pozniakas et al. | 355/299 |

FOREIGN PATENT DOCUMENTS

| | | |
|---|---|---|
| 59-131261 | 7/1984 | Japan . |
| 61-31276 | 2/1986 | Japan . |

*Primary Examiner*—Joan H. Pendegrass
*Attorney, Agent, or Firm*—Michelle W. Waites

[57] ABSTRACT

A method and apparatus for reproducing high quality images using an electrophotographic printing machine is disclosed.

More specifically, the present invention is used to change the location, shape and size of a process control patch. Process control patches may be used to improve the quality of an image prior to printing. The intensity of light reflected from the control patch is measured, and the measurements are used to change parameters such as magnitude of electrostatic charge, and toner concentration, before the latent image developed. Adjusting these parameters at this time will allow the printing apparatus to reproduce images having superior quality than previously available.

18 Claims, 11 Drawing Sheets

METHOD AND APPARATUS FOR CONTROLLING THE SEQUENCE, SIZE AND POSITION OF AN IMAGE CONTROL PATCH

The present invention is directed to a method and apparatus for obtaining information about an image, for use by an electrophotographic printing machine.

More specifically, the present invention is directed to a circuit which directs the placement of control patches. These patches provide information about the original image, thereby enabling a set of parameters to be varied to produce high quality, hardcopy output.

BACKGROUND OF THE INVENTION

The xerographic imaging process begins by charging a photoconductive member to a uniform potential, and then exposing a light image of an original document onto the surface of the photoconductor, either directly or via a digital image driven laser. Exposing the charged photoconductor to light selectively discharges areas of the surface while allowing other areas to remain unchanged, thereby creating an electrostatic latent image of the document on the surface of the photoconductive member. A developer material is then brought into contact with the surface of the photoconductor to transform the latent image into a visible reproduction. The developer typically includes toner particles with an electrical polarity opposite that of the photoconductive member. A blank copy sheet is brought into contact with the photoreceptor and the toner particles are transferred thereto by electrostatic charging the sheet. The sheet is subsequently heated, thereby permanently affixing the reproduced image to the sheet. This results in a "hard copy" reproduction of the document or image. The photoconductive member is then cleaned to remove any charge and/or residual developing material from its surface to prepare it for subsequent imaging cycles.

Electrophotographic printers which operate by projecting a laser scan line onto a photoconductive surface are well known. In printers such as these, it is common to employ a raster output scanner (ROS) as a source of signals to be imaged on the photographic member. The ROS provides a laser beam which switches on and off according to electronic image data associated with the image to be printed as the beam moves, or scans, across the charged photoreceptor. Laser diodes are typically used to generate the laser beam that is used to scan in a ROS system. The image data is driven in serial fashion to reproduce each line in the image. Modulation of the scanning beam is typically implemented by digitally controlling the output of the light beam or a modulator associated with a continuous laser source. As indicated above, the modulator causes the beam to emit light to discharge the surface of the photoreceptor in locations which are to remain blank in the original document.

Electrophotographic laser printers, scanners, facsimile machines and similar document reproduction devices, must be able to maintain proper control over the image producing apparatus to assure high quality, hardcopy outputs. For example, the level of electrostatic charge on the photographic member must be maintained at a certain level to be able to attract the oppositely charged toner particles. The light beam must have the proper intensity in order to be able to discharge the photoreceptor. In addition, the toner particles must have the proper concentration to ensure high print quality. As the printing machine continues to operate, changes to the operating environment will cause these parameters to vary from their initial set up values. For example, an increase in the humidity in the area surrounding the corona—the device used to generate the electrostatic charge on the photoreceptor will cause a decrease in the magnitude of the charge that is ultimately placed on the photoreceptor. Temperature changes, and changes due to ordinary wear of the machine parts will also have an impact. Thus, it is necessary to monitor each parameter, and to adjust them as necessary to maintain their initially assigned levels.

One way to control the many parameters within machine that operate together to reproduce an image is to use a density or process control patch positioned on the photosensitive or charge-retaining member of the apparatus. The control patch is usually generated by sending a known pattern of data to control the modulation of the light-emitting elements in the writing head. Since the data pattern is known, the electrostatic charge that must be present on the surface of the photoreceptor to create it is also known. The control patch is usually deposited onto a small area of the photosensitive member next to the region reserved for placement of the latent image, and the voltage levels across it are measured to provide an indication of its electrostatic charge. Feedback of information derived from the control patch allows for changes in one or more of the operating parameters, thereby enabling improve the image quality. Operating parameters include toner concentration, the magnitude of the charge on the photosensitive member, and the amount of exposure from the printhead or exposing device, all of which can be changed in response to the information obtained from the control patch.

An electrostatic voltmeter (ESV) is typically placed next the photoreceptor close enough to measure the voltage of the control patch. The ESV is placed somewhere near the photoreceptor, the exact location being dependent upon the space constraints of the area within the cavity of the machine surrounding the photoreceptor belt. Since the configuration of the parts within the machine varies as the design requirements of the printing system are changed, the ESV cannot always be placed at the same location near the photoreceptor. As cavity configurations are changed in order to accommodate system requirements, the ESV must be moved to different locations next to the photoreceptor. This means that the control patches must be capable of being placed at different locations if the ability to reproduce high quality copies is to be maintained.

While having the ability to vary the location of the control patch is advantageous, is often desirable to also be able to alter the size and shape of a control patch at will. For example, a recurring problem in the xerographic industry is cleaning of photoreceptor belt after transfer of the developed image to the copy media has taken place. Photoreceptor belts and drums are typically manufactured by joining a rectangular member at its ends to form a continuous loop. Once transfer of the developed image to the copy media has taken place, a blade or similar device is used to brush or scrape the remaining particles off of the surface of the photoreceptor. The seam that is formed when the ends of the photoreceptor belt are joined often tears the blade that cleans the photoreceptor. One successful way of solving this problem has been using a long thin strip of toner particles as a lubricant which covers the seam. Covering the seam allows the blade to pass over the photoreceptor without tearing. A method and apparatus of using toner particles to lubricate the cleaner blade in this manner is disclosed in U.S. Pat. No. 5,463,455 to Pozniakas et al. issued Oct. 31, 1995 whose contents are hereby incorporated by reference.

Thus, a printing apparatus that has the ability to change the location, shape and size of the control patch will be capable of reproducing images with superior quality. Rearranging or moving the location of the patch, or changing the physical size of the patch, according to the prior art, requires extensive reprogramming and data changes. Varying the size or location of the control patch according to the prior art, typically requires changing the memory previously dedicated to the data for creating the patch. This memory can be considerable in size, and reprogramming it to change the density of the control patch would leave little room for storing the imaging information. Therefore, it is desirable, and an object of this invention, to provide a control patch generator which can easily alter the size, shape and location of the control patch on the photosensitive member.

The following disclosures may be relevant to various aspects of the present invention:

U.S. Pat. No. 5,416,563 to Magde issued May 16, 1995 discloses an image processing apparatus having a corona device with a charging grid for charging a photoreceptor to voltage levels, a developer for applying toner to the photoreceptor, and a corona control responsive to the signal for charging the photoreceptor by adjusting the photoreceptor voltage levels in relation to discrete photoreceptor segments. The adjustment of voltage levels is done by providing signals from a sensor in response to developing a series of test patches on the photoreceptor, relating the signals from the sensor to a given test patch, associating each of the test patches to a given segment of the photoreceptor, and adjusting the charging grid to a given voltage for each segment of the photoreceptor in response to the signals from the test patches on the photoreceptor.

U.S. Pat. No. 5,227,270 to Scheuer, et. al. issued Jul. 13, 1993 discloses a pair of Electrostatic Voltmeters (ESV) utilized in a single pass tri-level imaging apparatus, to monitor various control patch voltages to allow for feedback control of Infra-Red Densitometer (IRD) readings. The ESV readings are used to adjust the IRD readings of each toner patch. For the black toner patch, readings of an ESV positioned between two developer housing structures are used to monitor the patch voltage. If the voltage is above target (high development field) the IRD reading is increased by an amount proportional to the voltage error. For the color toner patch, readings using an ESV positioned upstream of the developer housing structures and the dark decay projection to the color housing are used to make a similar correction to the color toner patch IRD readings (but opposite in sign because, for color, a lower voltage results in a higher development field).

U.S. Pat. No. 4,999,673 to Bares issued Mar. 12, 1991 discloses an apparatus which controls the parameters in a processing station of an electrophotographic printing machine having a photoconductive member. A test patch having a half tone image is recorded on the photoconductive member. The test patch is developed with developer material to form a developed half tone image on the photoconductive member. In response to the average density of the developed half tone image on the photoconductive member, the parameters of the processing station are regulated.

U.S. Pat. No. 4,949,105 to Prowak discloses a method and apparatus for generating a process control patch on a charge-retaining member in a photocopier or printer. Patch data is stored in binary form for a small portion of the first two lines of the patch. This data is replicated throughout the patch to provide the pixel data for the entire patch. Blank pixel data is sent to the printhead during portions of line scans which do not contain the control patch.

All of the references cited herein are incorporated by reference for their teachings.

Accordingly, although known apparatus and processes are suitable for their intended purposes, a need remains for processes and apparatus for measuring the performance of a xerographic ROS system. Further, there is a need for processes and apparatus for placing a process control patch of any size at any location on the surface of a photographic member. The ability to perform this task will enable the electrostatic charge on the control patch to be monitored throughout the printing operation. As a result, the operation parameters can be varied to maintain high print quality.

SUMMARY OF THE INVENTION

In accordance with the present invention, there is provided a circuit for generating document images and process control patches, and for placing the process control patches at any location upon the surface of a charge retentive photographic imaging member, which includes a machine controller; an image control circuit communicating with said machine controller; a patch control circuit, communicating with said machine controller and with said image control circuit; a computer memory communicating with said patch control circuit and with said image control circuit; and a plurality of patch patterns stored in said computer memory, said patch patterns having a plurality of shapes and/or sizes.

In accordance with another aspect of the invention, there is provided a method of placing an image at any location upon the surface of an electrostatically charged photographic member, which includes storing a plurality of patch patterns in a computer memory, said patch patterns having a plurality of shapes and/or sizes; inputting an original image into a printing system; defining said original image as a set of electronic signals; transmitting said image signals to an image control circuit; retrieving a patch pattern having a shape and size related to said electronic image signals from a location in a computer memory; designating the location upon the surface of the photographic member at which said patch pattern is to be placed; transmitting a set of signals representative of said patch pattern and location to said image control circuit; collecting said patch pattern and patch location signals to form a control patch defined by a set of electronic signals; selecting between said control patch signals and said original image signals for output and placement on the photoreceptor; transmitting said selected output signals to a modulated light source.

In accordance with yet another aspect of the present invention there is provided a circuit for generating process control patches having a variety of shapes and/or sizes an placing them at any location upon the surface of a photographic member, which includes means for storing a plurality of patch patterns in a computer memory, said patch patterns having a plurality of shapes and/or sizes; means for inputting an original image into a printing system; means for defining said original image as a set of electronic signals; means for transmitting said image signals to an image control circuit; means for choosing a patch pattern having a shape and size related to said electronic image signals; means for accessing an address in a computer memory at which said chosen patch pattern is stored; means for designating the location upon the surface of the photographic member at which said patch pattern is to be placed; means for transmitting a set of signals representative of said patch pattern and location to said image control circuit; means for collecting said patch pattern and patch location signals to form a control patch defined by a set of electronic signals; means for selecting between said control patch signals and said original image signals for output and placement on the photoreceptor; and means for transmitting said selected output signals to a modulated light source.

The present invention has significant advantages over current methods and apparatus for placing image control patches on electrophotographic members to improve image quality. First, it enables control patches having various sizes to be generated and stored in computer memory as operation continues. This makes it possible to adjust the printing system as environmental changes take place and the various parts begin to wear. Also, it enables control patches to be placed anywhere upon the surface of the photoreceptor, for subsequent measurement. This allows more efficient use of space within the machine, and enables the operating parameters to be accurately measured and altered as system requirements change.

BRIEF DESCRIPTION OF THE DRAWINGS

Other features and advantages of the present invention will become apparent as the following description proceeds and upon reference to the drawings, in which:

FIG. 11 B depicts a plurality of patch patterns placed together as a single control patch of the present invention.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method and apparatus for accurately reproducing images using an electrophotographic printing machine. Specifically the present invention relates to a method and apparatus for generating sequences of complex photoreceptor image patches that can be programmed in any order, size or position. Patches such as these are used to determine whether any of several parameters should be altered in order to continue to produce high quality output. The ability to produce these patches in random fashion results in accurate process control and machine calibration.

Figure 1:
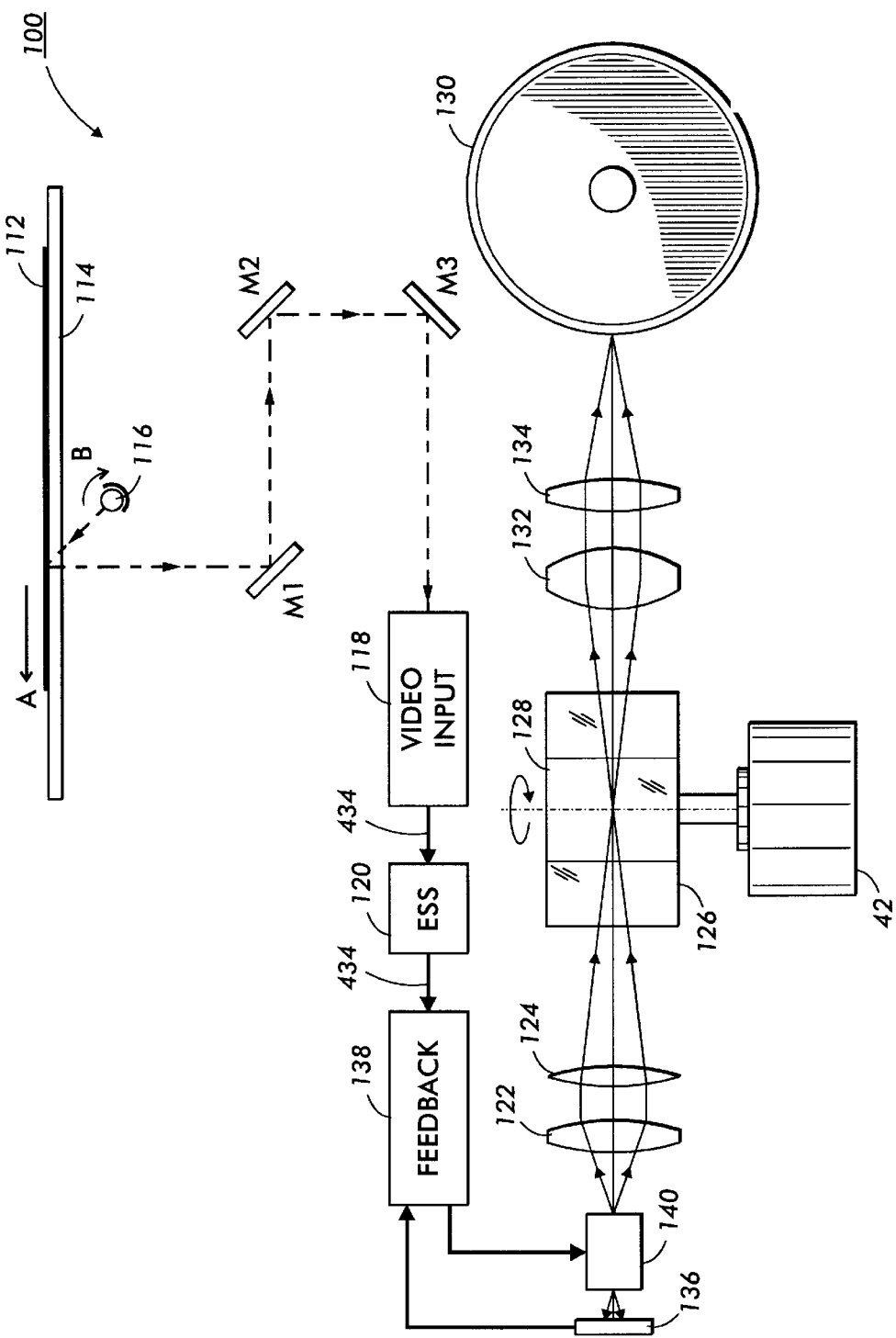
FIG. 1 is a schematic side view of a typical ROS system.

Referring now to the drawings where the showings are for the purpose of describing an embodiment of the invention and not for limiting same, FIG. 1 depicts a scanner, one type of device that often contains a raster output scanning (ROS) system in which the present invention may be used. The present invention may be used with any network video source which uses a ROS, such as a laser printer connected to a computer network, a video camera capable of producing printed output, or any other image acquiring source which uses a ROS to produce hardcopy output. A scanner is shown here for illustration purposes only, and the invention is not limited to this embodiment.

A typical scanning operation begins by placing a document 112 face down upon platen 114. Platen 114 and a light source 116 are placed in relative motion to cause scanning of document 112 by the light source. This scanning causes a small strip of light to extend across document 112 in the direction known as the fast scan direction. The illuminated portion of the image on document 112 is reflected onto mirror m1, and then to m2 and m3, for input into the optics system as image video signal 434.

Image video signal 434 is transmitted to a collimated light source 140 which produces a modulated diverging beam of coherent light. In the preferred embodiment, collimated light source 140 is a laser diode. However, other forms of collimated light sources may be used, including helium neon lasers, or light emitting diodes (LEDs) forming a printhead array. Light source 140 is driven in accordance with image signals entered into and processed by electronic subsystem (ESS) 120. The beam is collimated by a spherical collimated lens 122 and is next incident upon a cylindrical lens 124 which focuses the light to a line image in the fast scan direction onto a rotating polygon 126 having at least one mirrored facet 128. The rotation of the mirrored facets causes the beam to be deflected and thereby scanned across a photosensitive image member which is shown as a photoreceptor drum 130. Postscan optics system 132 reconfigures the beam reflected by facet 128 to a circular or elliptical cross-section, refocuses the beam to the proper point on the surface of drum 130, and corrects for scan nonlinearity (f-theta correction). A 1X (or other working magnification) toroidal lens 134 or cylinder mirror (not shown) is disposed between the rotating polygon 126 and the photoreceptor 130 to correct for wobble (scanner motion or facet errors) where appropriate.

Laser diodes, and other laser light sources typically have front and back facets. While the majority of the laser light escapes from the front of the array, some radiation is emitted from the back. This radiation is detected by photodiodes 136 which generate output signals that are sent into feedback circuit 138. This signal is compared to a predetermined voltage level corresponding to the desired power output of the laser diode.

Figure 2:
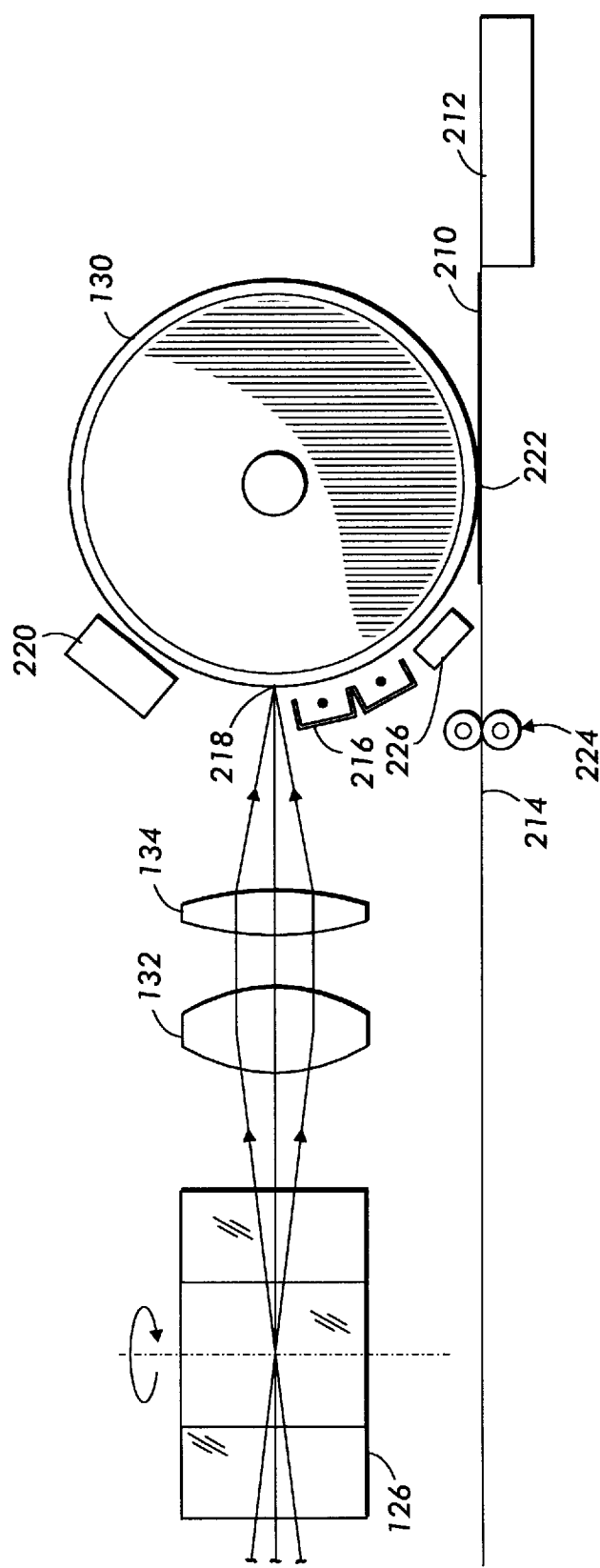
FIG. 2 is a schematic view of a xerographic scanning system including a ROS system, a photographic drum and the surrounding xerographic stations.

As shown in FIG. 2, blank copy sheets 210 are stored in paper tray 212 for entry into paper path 214. Photoreceptor drum 130 rotates clockwise through a charging station 216 which includes a corona discharge device, and exposure station 218 where the beam from rotation polygon 126 passing through a toroidal lens 134 would traverse a scan width on the drum in the fast scan direction. Photoreceptor 130 subsequently passes through a developing station 220, and a transfer station 222. A blank copy sheet 210 is passed in contact with photoreceptor 130 at transfer station 222. The drum then rotates past de-tack station (not shown) for removal of the copy sheet from the photoreceptor, and past cleaning station 226, where any remaining toner particles are removed, to prepare it for subsequent printing cycles. Once de-tack has taken place, the copy sheet with the developed image thereon then passes through fusing station 224 where the image becomes permanently affixed thereto. The reproduced copy of the original image is then transported from paper path 214 to an output tray (not shown).

Usable images are provided in that the information content of the location upon document 112 being scanned is represented by the modulated or variant intensity of light respective to its position within the scan width. As the scanning location traverses a charged surface, the electrostatic charge is dissipated in accordance with its light intensity. The electrostatic charge pattern thus produced is developed in the developing station and then transferred to the final copy paper.

Figure 3:
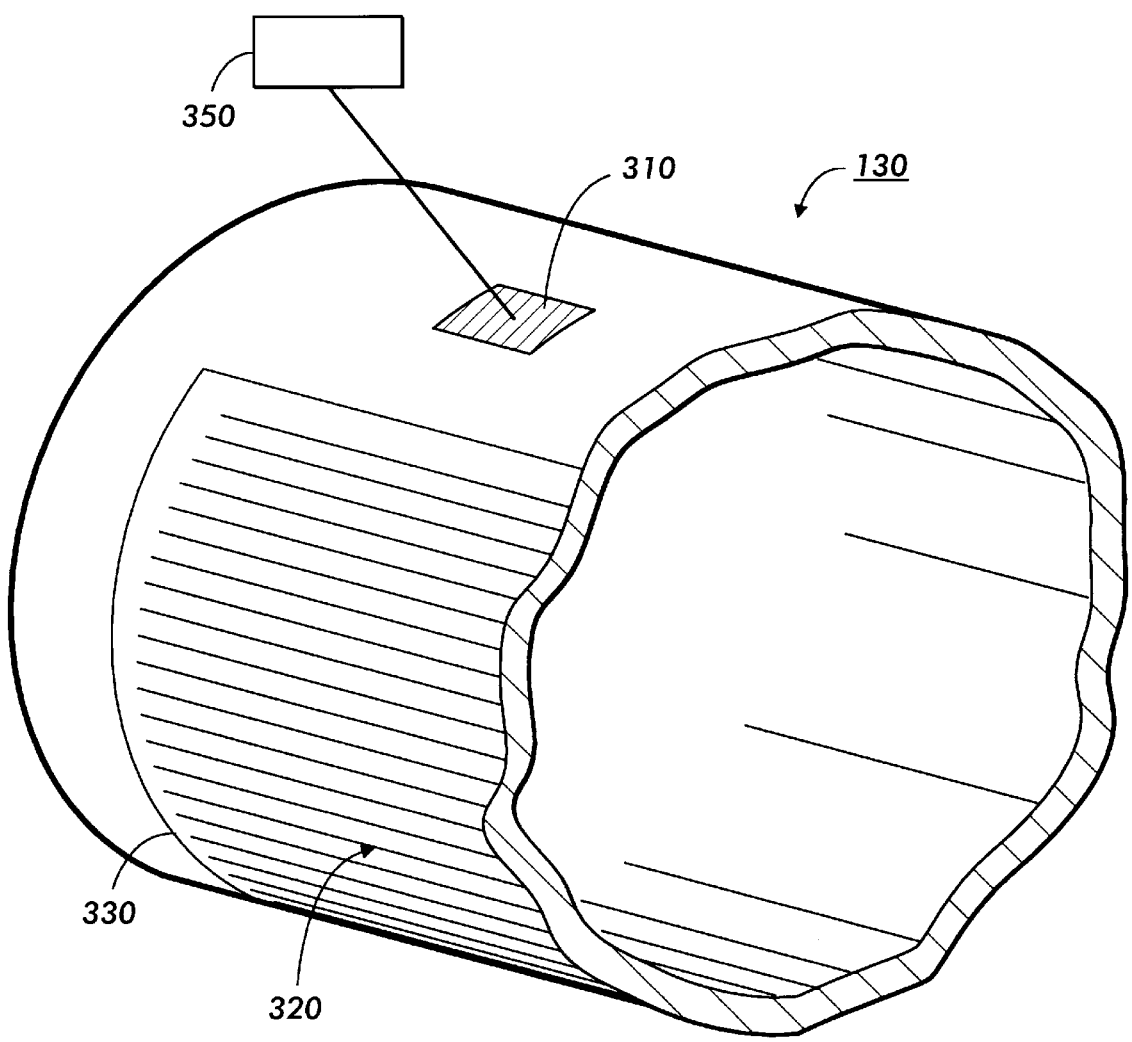
FIG. 3 contains a detailed illustration of the photoreceptor ROS system showing the relative locations of a latent image and an image control patch.

Referring now to FIG. 3 a process control patch 310 of the present invention is provided on the surface of photoreceptor 130. As shown, the size of process control patch 310 is typically smaller than that of latent image 320. Patch 310 is placed outside area 330, where latent image 320 is located. In accordance with the present invention, process control patch 310 may be placed in any location and in any size on the surface of photoreceptor 130.

Figure 11A:
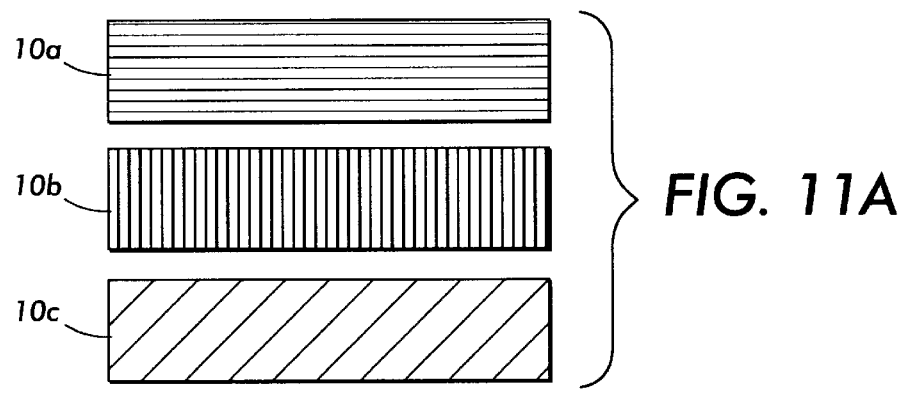
FIG. 11 A shows an example of patch patterns that may be used to form a control patch.
Figure 11B:
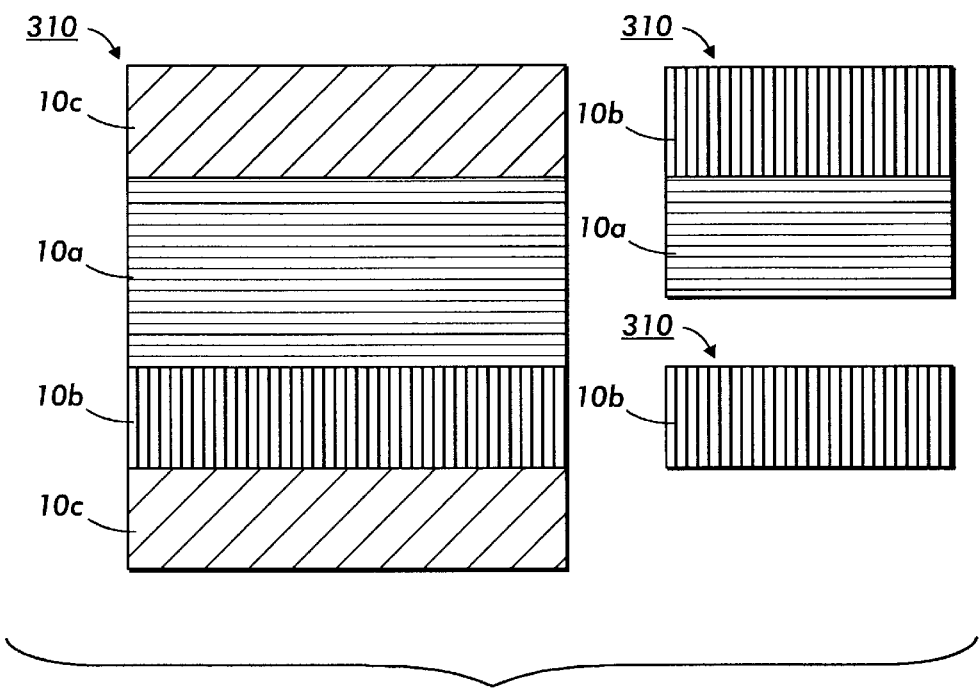

Beginning with FIG. 4, the details of the electronic circuitry of the present invention will now be described. The present invention integrates patch control circuit 440, patch RAM circuit 410, and image control circuit 420 to the process control system 400, which may be located on an ASIC (Application Specific Integrated Circuit) in a typical laser printing apparatus. It may generally be located somewhere within ESS 120, although other locations are possible and the invention is not limited to this embodiment. In the preferred embodiment, patch RAM 410 is a dual port RAM, with one port connecting the read lines and the other connecting to write lines. Patch RAM 410 stores multiple pre-determined patch patterns 10a, 10b and 10c, (best illustrated in FIG. 11A). which accessed by RAM address lines 412–418. Data which describes latent image 320 in its entirety is stored in bytes and is translated to pixels in image control block 420. Many patch patterns 10a, 10b, or 10c may be used together to form a single control patch 310 as shown in FIG. 11B.

Lines 412 and 414 will each include set of addressing lines, and the number of lines in each set will depend upon the number and configuration of the bits contained in each patch pattern. Lines 412 will be used to address the memory bytes which describe the patch pattern in the fast scan direction. Thus, if two bytes are required to describe each patch pattern in the fast scan direction, one addressing line 412 will be connected to provide the lower order addresses. The addressing line will provide one signal (i.e. off) to address the first byte, and retrieve its data, then the line will provide the opposite signal (i.e. on) to address the second byte and retrieve its data. The slow scan counter will then increment to begin writing the next line. Data from the first byte will be retrieved, then data from the second byte, and the slow scan counter will be incremented again to begin writing the next line. This process will continue until the bottom of the patch is reached. If four bytes are required to describe each pattern in the fast scan direction, two addressing lines will be required to address all of the bytes. If sixteen bytes are used to describe the patch pattern in the fast scan direction, four addressing lines will be required, and so on.

Data which describes each patch pattern in the fast scan direction could also be stored in a single byte. If this is the case, address line 412 will be disconnected, and only the slow scan address must be incremented in order to generate the full patch pattern data. A process control patch 2 bytes long in the fast scan direction would then require data located at the fast scan address to be generated twice. The address would then be incremented to move to the next line. The next pattern would be generated twice, and the address would be incremented again to move to the next line. This process will continue until the bottom of the patch is reached, and generation of the control patch is complete. It should be noted that in this embodiment, there will be no lower order address line 412 in FIG. 4.

The above description also applies to slow scan address lines 414. Thus if the slow scan length of a patch pattern is defined by 2 lines, one line is required to access the RAM to produce the middle order address. If the slow scan length is defined by four lines, two addressing lines are required. If the length of the patch pattern in the slow scan direction is eight lines, three addressing lines will be required, and so on.

One successful embodiment has been to use patch patterns having one byte of data in the fast scan direction, and eight lines in the slow scan direction. As indicated above, this embodiment allows lower order address lines 412 to be disconnected, and requires three middle order address lines to be connected to the RAM. In this embodiment, four patches are stored in the RAM, and two more addressing lines are provided to access the four different patches. If 8 patches were stored in the RAM, three lines would be required. If 16 patches were stored, 4 lines would be required, etc. Thus, the embodiment described here requires a total of 5 addressing lines which access a total of 32 bytes of memory. Again, this addressing method is merely one manner in which RAM address lines can be used to select a specific number of patch patterns. More or fewer patches can be stored in the RAM, the imaging data stored can require more or fewer than eight bytes of memory, and thus more or fewer select lines can be required to access the patches. Other addressing methods and configurations will typically be dependent on the desired size of the image, number of patches, desired image length/width, and RAM size. Thus, the invention is not limited to the embodiment described herein.

Figure 4:
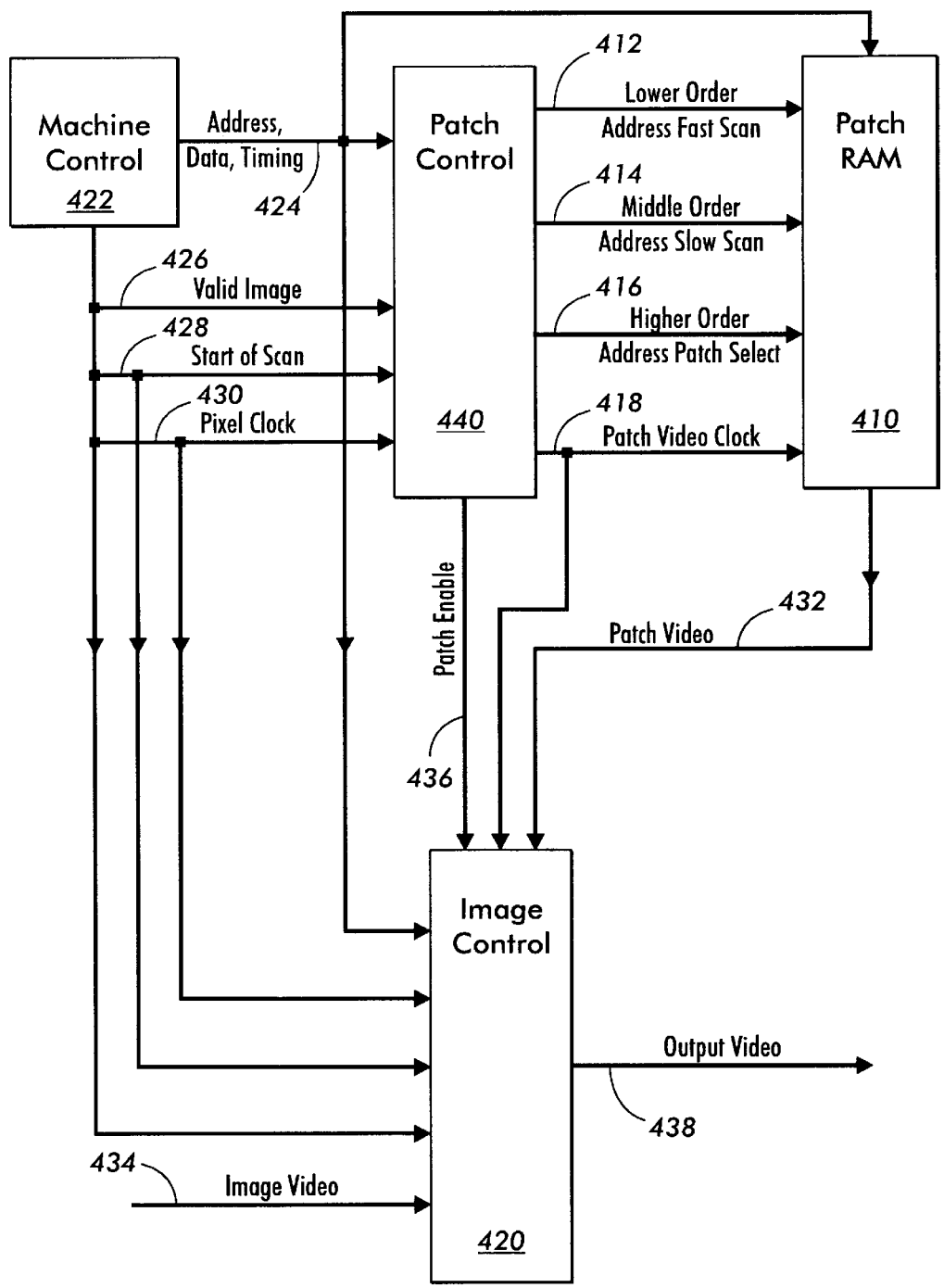
FIG. 4 is a circuit diagram depicting the process control patch generating hardware of the present invention.

With continued reference to FIG. 4, machine control block 422 transmits data for location, order, overall size, and individual size of patch 310 to patch control block 440. In the embodiment described machine control block 422 communicates with patch control block 440 via address, data and timing signals 424. Patch control block 440 receives 3 real time, timing signals: valid image signal 426, which indicates the beginning of a page in the slow scan direction (the direction of motion of photoreceptor 130), start of scan signal 428, which indicates the beginning of the image in the fast scan direction (transverse to the direction of motion of photoreceptor 130) and counts slow scan lines, and pixel clock signal 430 which is used to count fast scan pixels (those in the fast scan direction). Patch video 432 is multiplexed with image video signal 434 in image control block 420.

With continued reference to FIG. 4, when patch enable signal 436 is asserted, patch video 432 is selected in image control block 420, and will be transmitted from image control block 420 as output video signal 438. When patch enable 436 is off, image video signal 434 is selected and will be sent out of image control block 420 as output video 438. Image control block 420 uses patch video clock 418 to enable input of patch video 432. Image control block 432 also uses machine control bus 422 and image video 434 to do image registration similar to the patch control block 440.

Figure 5:
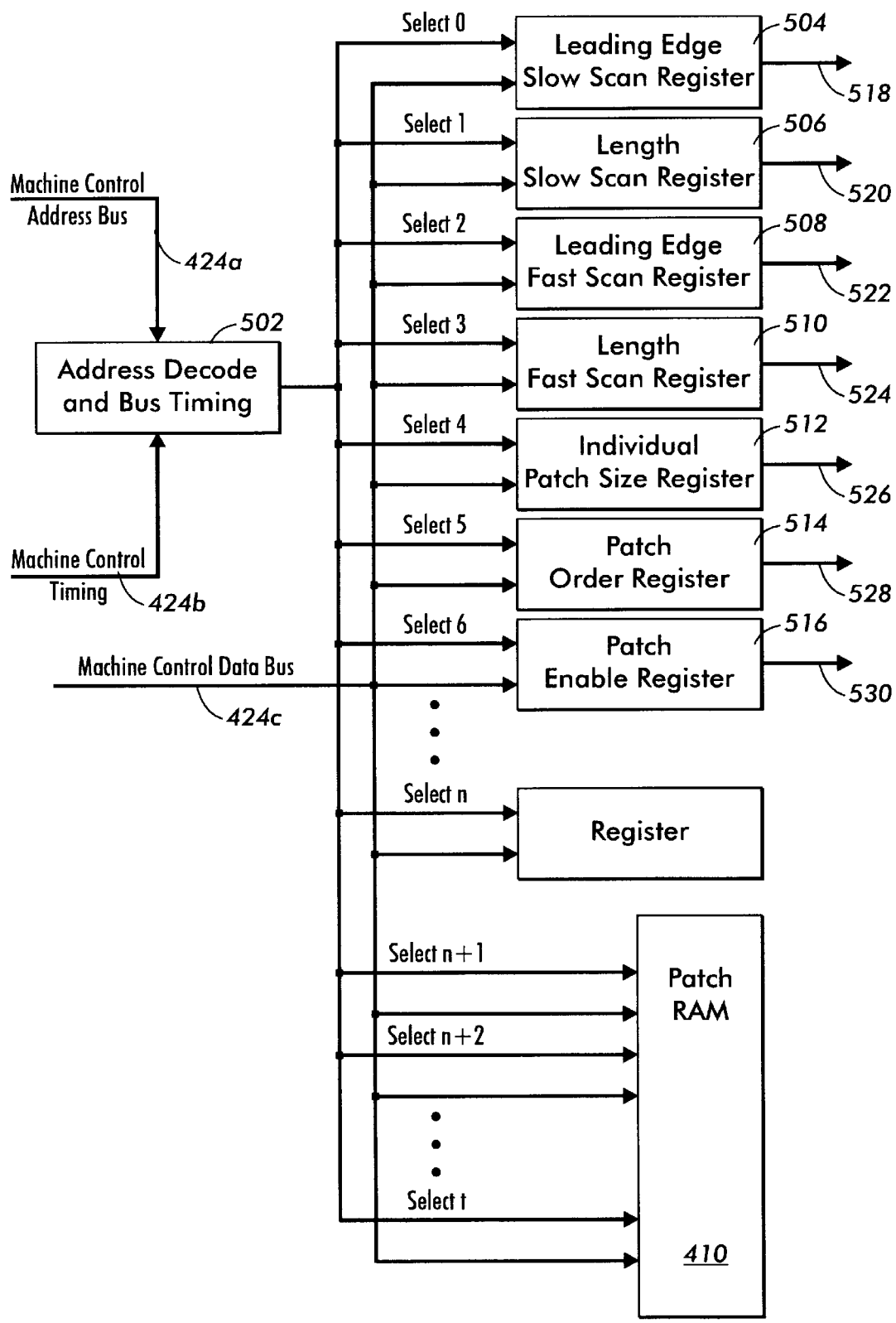
FIG. 5 is a detailed illustration of the hardware at the interface between the printing machine and the patch control stem.

FIG. 5 contains a block diagram showing each of the registers that effect the patch image. Leading edge slow scan data, stored in register 504, indicates the amount of delay from valid image to the beginning of the patch. In other words, in order to properly place the chosen patch on the surface of photoreceptor 130, the ROS system should wait the amount of time indicated by the data stored in register 504 before it begins to discharge next line on the photoreceptor (i.e. discharge the photoreceptor in the slow scan direction). Once the designated amount of time has passed, leading edge slow scan data will control discharging of photoreceptor 130 to place control patch 310 at the appropriate location in the slow scan direction.

Length slow scan data, stored in register 506, describes the slow scan length of the entire patch 310. Thus, the data stored in register 506 indicates when transmission of imaging data for control patch 310 in the slow scan direction has been completed.

Leading edge fast scan data, stored in register 508, designates the delay from start of scan to the beginning of the patch 310. This means that the data stored in register 508 indicates the amount of time the ROS should wait before discharging photoreceptor 130 across the width of the drum within a single line (i.e. discharging the photoreceptor in the fast scan direction).

Length fast scan data, stored in register 510, is the fast scan length of patch 310. This data indicates when transmission of imaging data for control patch 310 in the fast scan direction has been completed.

It is possible, and often desirable, to place more than one patch onto the surface of photoreceptor 130. For example, a patch having low voltage values may be followed immediately by a patch containing middle voltage values, and a patch having high voltage values, with all three patches placed together on the drum. This will enable the ESV to determine how well the imaging system is responding to light, dark, and blank areas within an image. Individual patch size data, stored in register 512, denotes the slow scan length of each individual selected patch pattern.

Patch order data in register 514, is the programmed sequence of patch patterns 10a, 10b, or 10c that can be assigned to a position within control patch 310. Any patch pattern in the RAM can be assigned to any position within control patch 310 through patch order register 514.

FIG. 5 illustrates the manner in which the printing machine uses patch enable register 516 to enable or disable a patch pattern in any particular image zone. As indicated in the illustration, machine control bus 422 actually transmits three signals; address signal 424a, timing signal 424b, and data signal 424c. Address signal 424a and timing signal 424b are transmitted to address decode and bus timing block 502 within patch control block 440, while data signal 424c is transmitted to patch enable register 516. Address decode and bus timing block 502 maps the correct address to latch the data on the data bus into the correct register 504 to 516.

Figure 6:
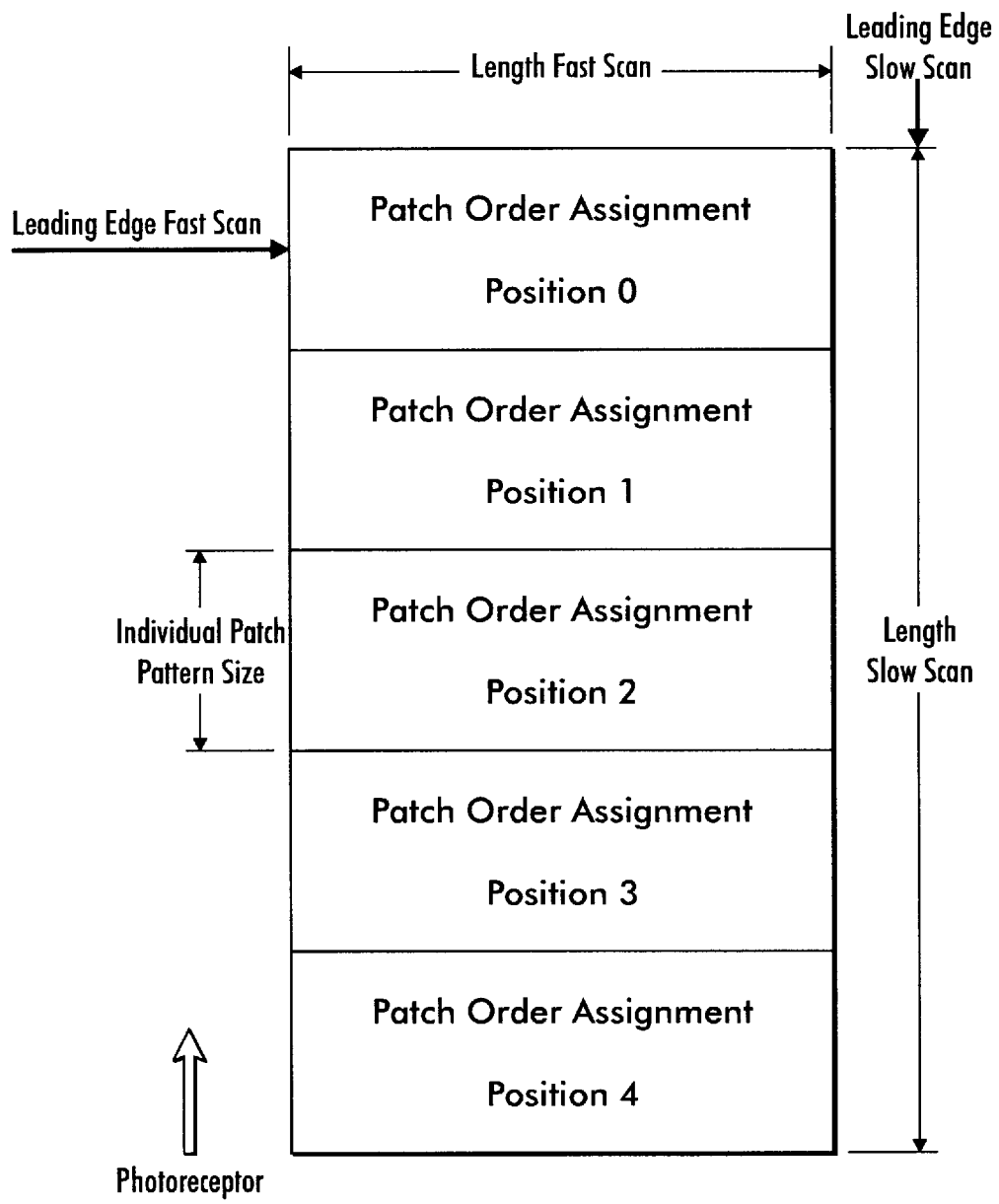
FIG. 6 shows the configuration of the registers of the machine control/Patch control interface.

FIG. 6 shows how multiple patch patterns 10a, 10b, and 10c can be placed together on photoreceptor 130 to form a single control patch 310. It should be noted that the invention is not limited to placing multiple patterns together to form a single control patch 310. Each pattern can be used alone if such a scheme is desired. Photoreceptor 130 rotates in the direction from the bottom of FIG. 6, toward the top. When multiple patch patterns are used to form control patch 310, the first pattern addressed will be placed at patch order assignment position 0. Subsequent patterns will be placed consecutively at assignment positions 1, 2, 3, etc. Thus, the earlier a patch pattern is removed from RAM 410, the higher up (lowest numerical order) it will be positioned upon the surface of photoreceptor 130.

Figure 7:
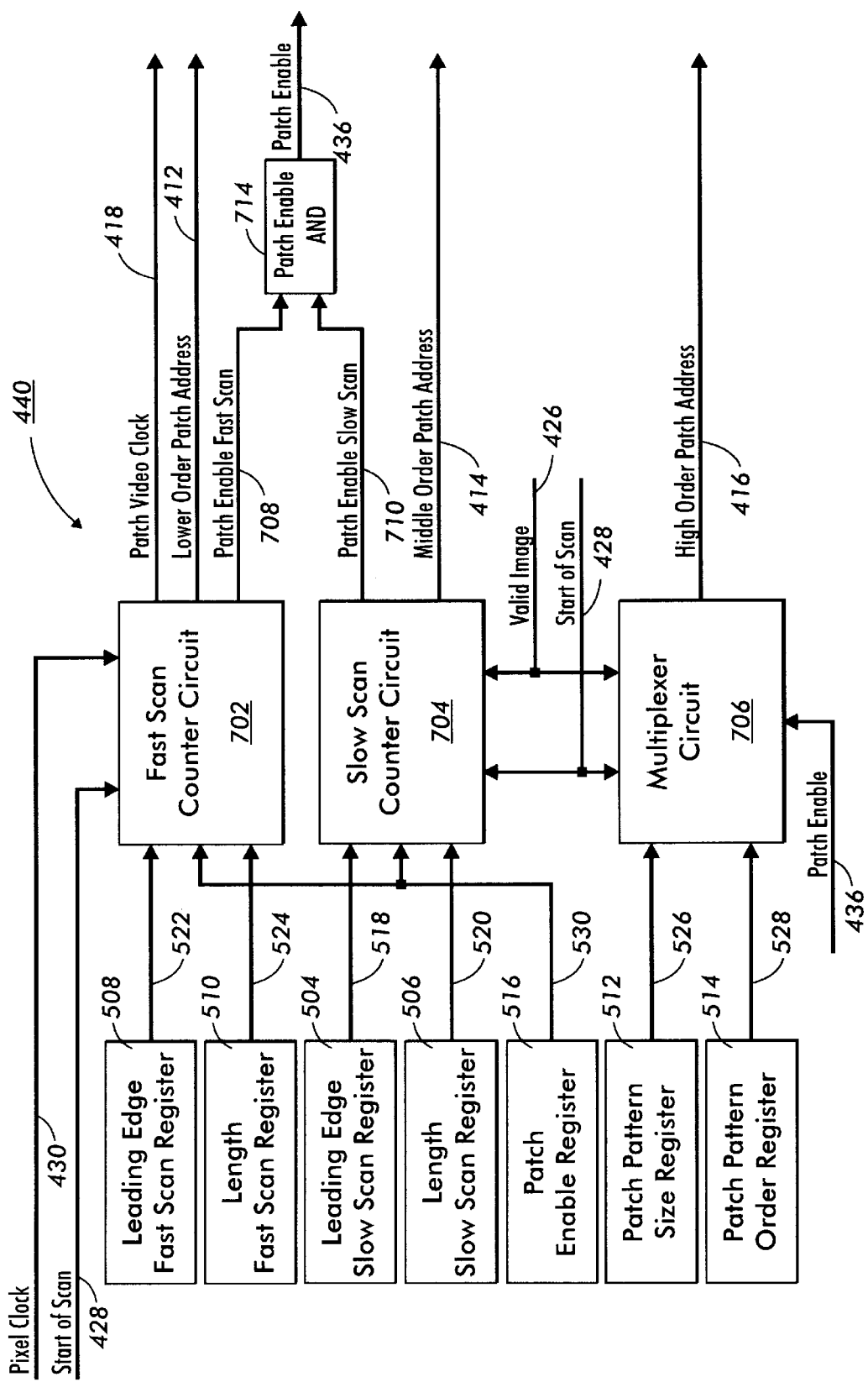
FIG. 7 contains a detailed illustration of the patch control cult of the present invention which is imbedded within a typical process control circuit.

FIG. 7 is a block diagram which describes patch control block 440 in detail. Fast scan counter circuit 702 receives the fast scan leading edge 522 and fast scan length 524 signals, which are responsive to the data stored in leading edge fast scan register 508 and length fast scan register 510 respectively. If the data stored in patch enable register 516 indicates that a patch will be generated, the output signal 530 from patch enable register 516 will cause counter circuit 702 to begin counting at start of scan 428 using pixel clock 430. The output from counter circuit 702 is patch video clock 418, the lower order patch addresses 412, and patch enable fast scan 708, which is asserted when patch 310 is active. For example, if the patch pattern has 2 bits per pixel and the address of each patch pattern takes up 1 byte of memory in RAM 410, then there are 4 pixels per byte and the patch video clock would be ¼ the pixel clock rate.

With continued reference to FIG. 7, slow scan counter circuit 704 receives the slow scan leading edge 518 and slow scan length 520 signals, which are dependent upon the data stored in leading edge slow scan register 504 and length slow scan register 506 respectively. If patch enable register signal 530 is asserted then the counter circuit 704 begins counting upon transmission of valid image signal 426 using start of scan signal 428 as a clock i.e. slow scan data for a single patch pattern will be generated until the next start of scan signal is received. The output of slow scan counter circuit 704 is the middle order patch addresses 414, and patch enable slow scan 710 which is asserted if the patch pattern is active. Patch enable fast scan 708 and patch enable slow scan 710 are inputs to an AND gate 714 whose output is real time patch enable line 436 which is asserted any time the designated patch pattern is printing.

When multiple patches are used to form control patch 310, multiplexer circuit 706 receives patch pattern size 526 and patch pattern order 528 signals, from the data stored in patch pattern size register 512 and patch order register 514, respectively. When real time patch enable signal 436 is asserted, multiplexer 802, shown in FIG. 8 outputs the patch pattern order selection as the high order patch address 416 during each patch size period. As an example, if the size of the patch pattern is 1 inch, the high order patch address would reflect the value in the patch order register for each 1 inch of patch printed. The first inch would be the patch pattern assigned to position 1, the second inch would be the patch pattern assigned to position 2, and so on. In this example, the register is sixteen bits wide, has two bits per position selection, and is eight selections long. If the patch length is longer than eight individual patches can fill, the pattern would repeat.

Figure 8:
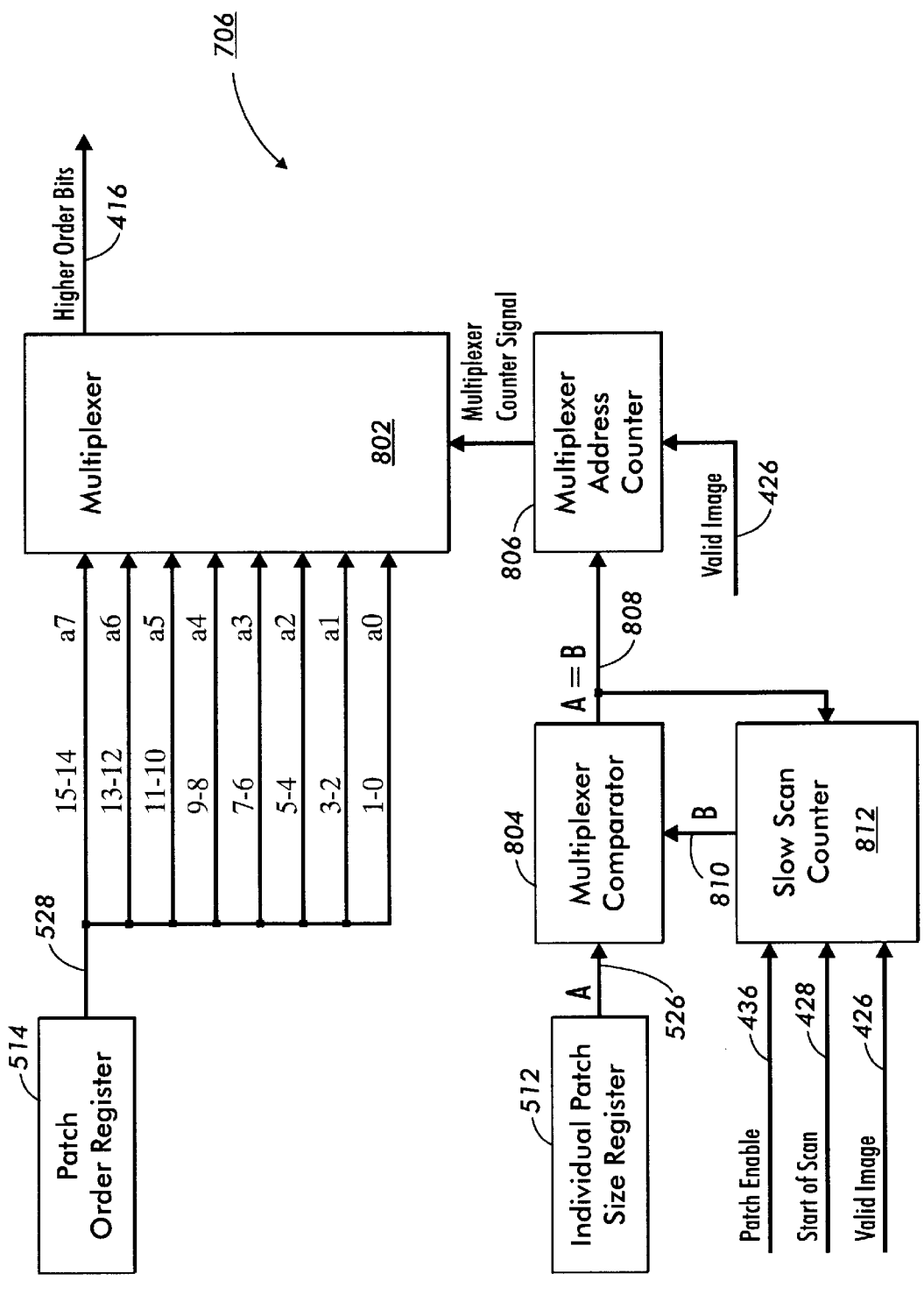
FIG. 8 shows a detailed illustration of the multiplexer circuit which is part of the patch control circuit of the resent invention.

FIG. 8 shows the details of the multiplexer circuit 706. In the preferred embodiment, the patch order data 528 is split into two bits per selection with eight selections into a one of eight, two bit bus multiplexer 802. The hardware could be configured for any number of bits per selection and any number of selections. Thus, the invention is not limited to a two bit per selection and eight selection embodiment. The output of multiplexer 802 is patch RAM high order address bits 416. The individual patch size signal, indicative of the data stored in individual size patch register 512, is input to a comparator 804 along with the output 810 of a slow scan counter 812. Valid image signal 426 resets the counter and when real time patch enable signal 436 is asserted the counter starts counting start of scan signals 428. Valid image signal 426 also resets the multiplexer address counter 806 so the initial selection of a0 is output as the high order address. When output 810 of slow scan counter 812 is equal to patch size output signal 526 from patch size register 512, the comparator output 808 is asserted. This increments multiplexer address counter 806 and also resets slow scan counter 812. The multiplexer address now points to al so that whatever patch is selected for al will be output on the high order address line 416. Slow scan counter 812 starts counting again and so the process continues as the multiplexer address proceeds to point to each of patch locations a0 through a7 until real time patch enable line 436 is no longer asserted.

Figure 9:
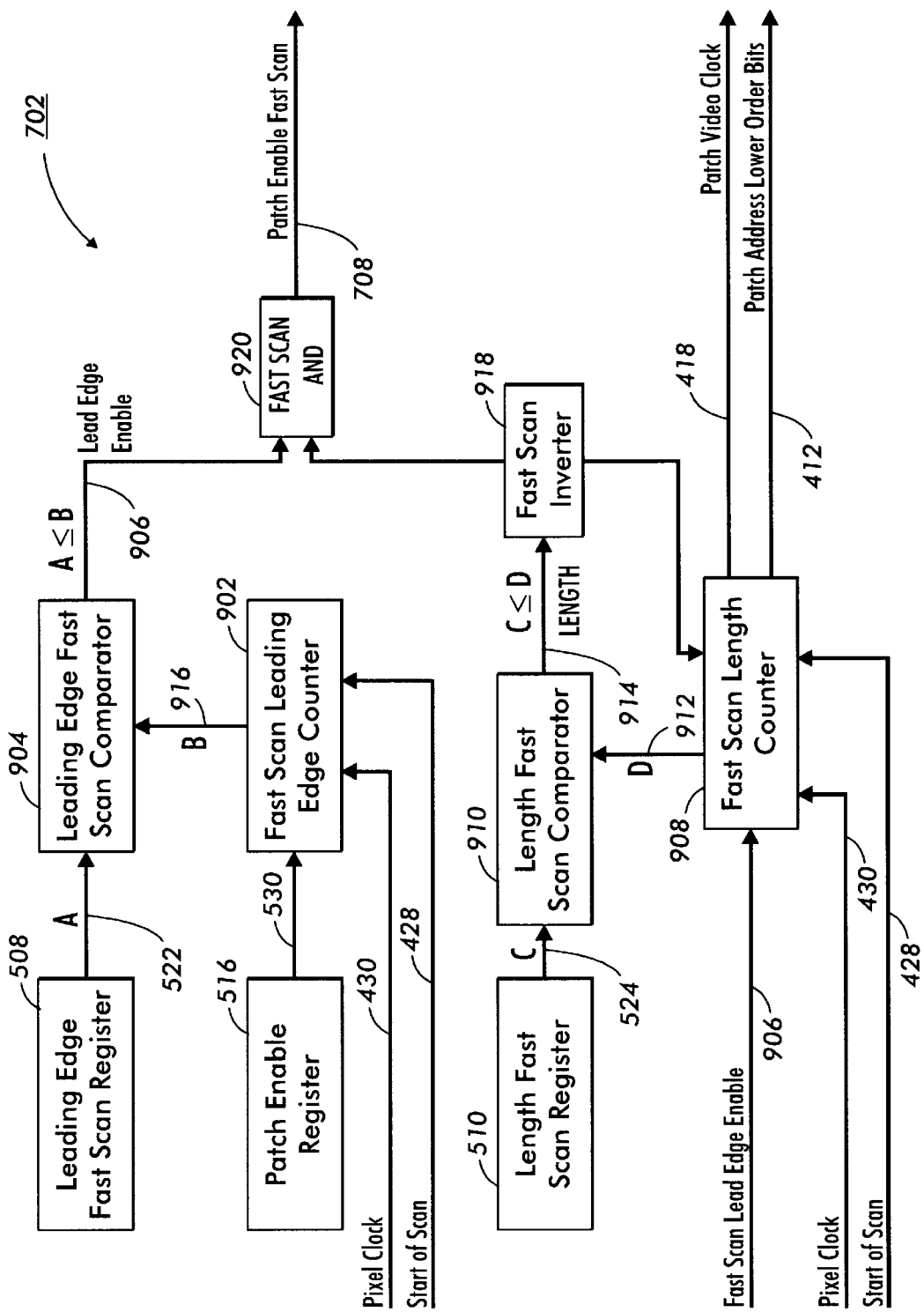
FIG. 9 shows the details of the fast scan counter circuit which is part of the patch control circuit of the present invention.

FIG. 9 shows the details of fast scan counter circuit 702. Leading edge fast scan signal 522 from register 508 and the output 916 of a fast scan leading edge counter 902 are inputs to leading edge fast scan comparator 904. Start of scan signal 428 resets fast scan leading edge counter 902. When patch enable register signal 530 from register 516 is asserted fast scan leading edge counter 902 starts counting pixel clock signals 430. When the leading edge fast scan signal 522 is less than or equal to output 916 off fast scan leading edge counter 902, fast scan lead edge enable signal 906 is asserted. This indicates the start of the fast scan leading edge of control patch 310.

Fast scan length signal 524 and the output 912 of a fast scan counter 908 are inputs to a length fast scan comparator 910. Start of scan signal 428 resets fast scan counter 908. When fast scan lead edge enable signal 906 is asserted fast scan length counter signal 908 begins counting pixel clock signals 430. When the length edge data 524 is less than or equal to the length counter data output 912, length fast scan signal 914 is asserted to indicate the end of the fast scan patch. Length fast scan signal 914 is inverted at fast scan inverter 918, and is fedback to fast scan length counter 908 as a disable signal. The inverter signal also goes to fast scan AND gate 920 along with fast scan lead edge enable signal 906. The output of fast scan AND gate 920 is the patch enable fast scan 708 which is asserted whenever the patch is active in the fast scan direction. Patch video clock signal 418 and patch lower order address bits 412 are also outputs from fast scan length counter 908.

Figure 10:
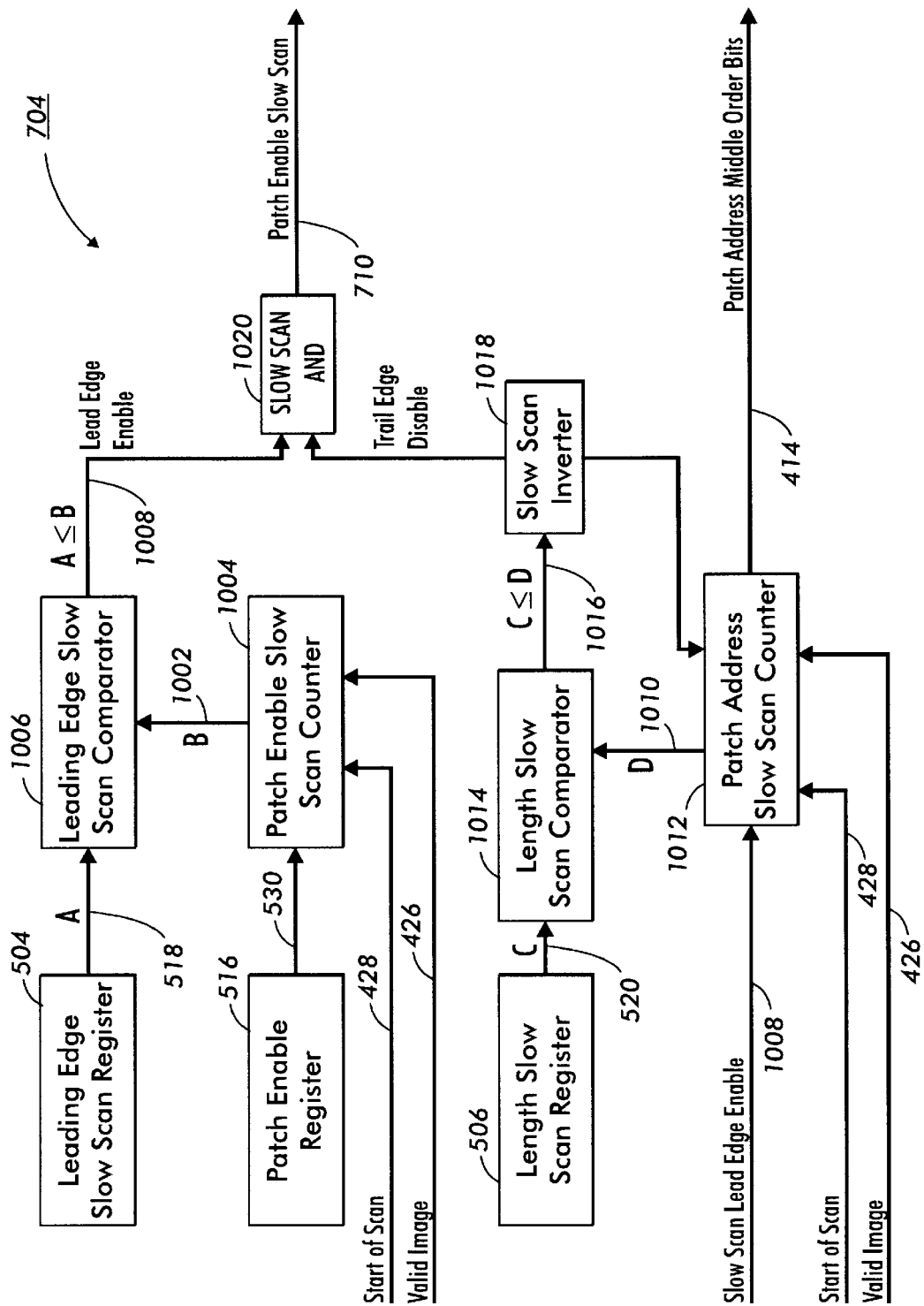
FIG. 10 illustrates the details of the slow scan counter circuit imbedded within the patch control circuit of the present invention.

Referring now to FIG. 10, the details of slow scan counter circuit 704 will now be described. The leading edge slow scan signal 518 from leading edge slow scan register 504 and the output 1002 from patch enable slow scan counter 1004 are inputs to leading edge slow scan comparator 1006. Valid image signal 426 resets patch enable slow scan counter 1004. When signal 530 from patch enable register 516 is asserted, patch enable slow scan counter 1004 starts counting start of scans 428. When leading edge signal 518 from register 504 is less than or equal to counter data output 1002, slow scan lead edge enable signal 1008 is asserted. This indicates the start of slow scan leading edge of patch 310. The slow scan length data 520, output from length slow scan register 506 and the output 1010 of patch address slow scan counter 1012 are inputs to length slow scan comparator 1014. Valid image 426 resets patch address slow scan counter 1012. When slow scan lead edge enable 1008 is asserted the length counter begins counting start of scans. When slow scan length edge signal 520 is less than or equal to patch address slow scan counter output 1010, length slow scan comparator signal 1016 is asserted, indicating that the end of the slow scan patch has arrived. This signal is inverted at slow scan inverter 1018, and fedback to patch address slow scan counter 1012 as a disable signal. This inverted signal also goes to slow scan AND gate 1020 along with the slow scan lead edge enable signal 1008. The output of slow scan AND gate 1020 is patch enable slow scan 710 which is asserted whenever patch 310 is the slow scan direction. Patch address slow scan counter 1012 also has the patch middle order address bits 414 as outputs.

With reference to FIGS. 1–4, operation of the present invention within a laser printing machine will now be described. Referring first to FIG. 1, data which describes an image on a document 112 is transmitted as image video signal 434. In the embodiment shown, a scanner is used to obtain the data which comprises image video signal 434. A typical scanning operation is performed by first placing document 112 with an original image thereon upon platen 114, and illuminating a light source 116. Platen 114 and light source 116 are moved relative to each other to cause a thin strip of light to extend across document 112 the fast scan direction. The illuminated potion of the image is reflected through the scanner cavity, resulting in image video 434. Instead of output from a scanner, image video signal 434 could be data acquired from a computer system, from a video camera, or another networked video source.

Referring now to FIG. 4, without the present invention, output video signal 438 would be obtained directly from the video source, to create latent image 320 on photoreceptor 130. Patch control block 440, patch RAM 410, and image control block 420 would not be present within the circuit. With the present invention added to the circuitry, but inoperative i.e. the imaging system software dictates generation of the latent image onto the surface of photoreceptor 130 rather than a control patch, patch enable signal 436 will be off. This prevents the patch control block 440 from operating, and causes the process control system to act as though patch control block 440 and patch are not connected to process control circuit 400. Image control block 420 will simply serve as a conduit through which image video signal 434 will pass, to be output as output video signal 438.

The present invention implements patch control circuit 440, patch RAM 410, and image control circuit 420 into a single ASIC. Patch control block 440 and image control block 420 are connected to machine control block 422, with lines that include address, data and timing signal 424, valid image signal 426, start of scan signal 428 and pixel clock signal 430. Patch control and image control blocks are connected via patch enable signal 436 and patch video clock signal 418, while patch RAM 410 and image control block 420 are connected via patch video clock signal 418 and patch video 432. Once the image data reaches image video 434, the imaging software that is part of the printing system selects the appropriate control patch for successful reproduction of the image. Patch RAM 410 has one output, patch video signal 432, which contains the imaging data for the selected patch.

Prior to operation of the present invention, patch patterns of various shapes and sizes must be stored in patch RAM 410. In the preferred embodiment, a user interface will be used to add new patch patterns in RAM 410, as well as to delete and alter patterns that have already been stored. In the alternative, a read only memory may be used to store predetermined patch patterns. When the present invention is operative, i.e. the imaging system software dictates generation of a control patch 310, machine control block 422 transmits address, data, and timing signal 424, valid image signal 426, start of scan signal 428, and pixel clock signal 430 to patch control block 440. Once the pattern or patterns desired for control patch 310 have been selected, the four output signals 412–418 are used to address patch RAM 410. Patch video clock signal 418 is also transmitted to image control block 420. While patch control output signals 412–418 are being sent to patch RAM 410, patch enable signal is sent to image control block 420. Patch ROM 410 outputs the patch imaging data as patch video signal 432, for input to image control block 420. When all three inputs patch video clock signal 418, patch video signal 432, and patch enable signal 436 are present at image control block 420, output video signal 438 will be transmitted from image control block 420, thereby enabling placement of the appropriate patch pattern(s) onto the surface of photoreceptor 130.

Referring back to FIG. 1, regardless of the type of image data it contains, output video signal 438 is transmitted to collimated light source 140, which in turn produces a beam of light that passes through lenses 122 and 124 to focus the light beam on rotating polygon 126.

Referring now to FIG. 2, charging station 216 is activated to place an electrostatic charge onto the surface of photoreceptor 130. Photoreceptor 130 is rotated in the clockwise direction, and the beam of light is reflected from polygon 126 through lenses 132 and 134 and onto photoreceptor 130, to create either the latent image 320 or a control patch 310.

As shown in FIG. 3, latent image 320 will be confined to area 330, while process control patch 310 will be placed onto photoreceptor 130 outside area 330. An ESV 350 (not shown) will have already been placed within the printing machine near photoreceptor 130 in the designated area. The system software is programmed to place control patch 310 next to ESV 350. Control patch 310 is created by discharging photoreceptor 130 at the locations where the beam of light strikes it. Electrostatic charges will remain in the areas on photoreceptor 130 that have not been stricken by the light beam. The resulting electrostatic control patch will be measured by ESV 350. The voltage that should be present on the photoreceptor for any given patch is a known value. ESV 350 will be used to measure the actual voltage of control patch 310, to enable the known voltage value for any patch to be compared to the measured value, thereby providing an indication of the performance of the printing system. This performance data can be collected and used to alter variables such as light intensity of the beam used to strike photoreceptor 130, as well as the magnitude of the initial charge placed on the photoreceptor, concentration of toner particles, or any other parameter that may be changed to improve the quality of a reproduced hardcopy image.

Referring back to FIG. 2, photoreceptor 130 will continue to rotate in the clockwise direction past development station 220. Toner particles having a polarity opposite the charge on the surface of photoreceptor 130, are deposited onto the photoreceptor, to develop latent image 320. The drum will continue to rotate until it reaches transfer station 222 to allow area 330 which contains the developed image, to be placed in contact with a blank copy sheet 210 which has been removed from paper tray 212. This causes the developed image to be transferred to the copy sheet. The sheet will then be charged at a de-tack station (not shown) with a polarity that causes it to be removed from the surface of the photoreceptor. The copy sheet will then pass through fusing station 224 where the toner particles will become permanently affixed to the copy sheet. The copy sheet will then be transported along paper path 214 to an output tray (not shown).

Photoreceptor 130 will continue to rotate clockwise after the copy sheet has been separated from it, and will pass cleaning station 226 where any remaining toner particles will be removed. It may be noted that toner particles will have been deposited onto control patch 310 as it rotated past development station 220. These particles will be among those removed from photoreceptor 130 at cleaning station 226. Once photoreceptor 130 passes cleaning station 226, it will be ready to be charged again, making it available for subsequent imaging cycles.

It is, therefore, apparent that there has been provided in accordance with the present invention, a method an apparatus for controlling the sequence, size and position of an image control patch that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A circuit for generating document images and process control patches, and for placing the process control patches at any location upon the surface of a charge retentive photographic imaging member, comprising:

a) a machine controller;
 b) an image control circuit communicating with said machine controller;
 c) a patch control circuit, communicating with said machine controller and with said image control circuit;
 d) a computer memory communicating with said patch control circuit and with said image control circuit; and
 e) a plurality of patch patterns stored in said computer memory, said patch patterns having a plurality of shapes and/or sizes.

2. A circuit as claimed in claim 1 wherein said image control circuit further comprises:

a) a document image input location at which document image data is received;
 b) a plurality of input locations at which data from said machine controller is received, said machine controller data including a designated patch pattern configuration, and a location on the photoreceptor at which said patch pattern will be placed;
 c) a patch image input location at which patch image data is received;
 d) a patch enable input location for selecting between said patch image data and said document image data for output from said image control circuit; and
 e) an output location at which said selected data is transmitted from said image control circuit.

3. A circuit as claimed in claim 1 wherein said patch control circuit further comprises:

a) a plurality of input locations at which data from said machine controller is received, said machine controller data including a designated patch pattern configuration, and a location on the photoreceptor at which said patch pattern will be placed; and
 b) a plurality of output locations which serve as input to said computer memory, said output locations containing an address at which said designated patch pattern is stored in said computer memory.

4. A circuit as claimed in claim 1 wherein said computer memory further comprises:

a) an input location at which data from said machine controller is received, said data including said plurality of patch patterns;

b) a plurality of locations at which patch image data can be stored;

c) an addressing line for accessing said stored data; and d) an output line for transmitting stored patch image data to said patch image input.

5. A circuit as claimed in claim 1 wherein said plurality of patch patterns further comprise sets of electronic signals which serve as input to a light source to discharge designated locations on the surface of the charge retentive photographic member.

6. A circuit as claimed in claim 1, wherein said computer memory further comprises a random access memory.

7. A circuit as claimed in claim 6, wherein said random access memory is a dual port random access memory.

8. A circuit as claimed in claim 1, wherein said computer memory further comprises a pre-programmed read only memory.

9. A circuit as claimed in claim 1, wherein said patch control circuit further comprises:

a) a plurality of storage registers;

b) a multiplexer circuit having an output signal indicative of a first portion of a patch address;

i) a slow scan counter circuit having an output signal indicative of a second portion of a patch address; and j) a fast scan counter circuit having an output signal indicative of a third portion of a patch address as output.

10. A circuit as claimed in claim 9, wherein said patch control circuit output signals further comprise:

a) a signal indicative of a first portion of a patch address;

b) a signal indicative of a second portion of a patch address;

c) a signal indicative of a third portion of a patch address as output; and d) a patch enable signal which serves as input to said image control circuit to indicate generation of the control patch.

11. A method of placing an image at any location upon the surface of an electrostatically charged photographic member, comprising:

a) storing a plurality of patch patterns in a computer memory, said patch patterns having a plurality of shapes and/or sizes;

b) inputting an original image into a printing system;

c) defining said original image as a set of electronic signals;

d) transmitting said image signals to an image control circuit;

e) retrieving a patch pattern having a shape and size related to said electronic image signals from a location in a computer memory;

f) designating the location upon the surface of the photographic member at which said patch pattern is to be placed;

g) transmitting a set of signals representative of said patch pattern and location to said image control circuit;

h) collecting said patch pattern and patch location signals to form a control patch defined by a set of electronic signals;

i) selecting between said control patch signals and said original image signals for output and placement on the photoreceptor;

j) transmitting said selected output signals to a modulated light source.

12. A method as claimed in claim 11 further comprising:

a) measuring an electrostatic charge of said control patch;

b) comparing said measured charge to a known charge for said control patch; and c) adjusting a set of imaging parameters based upon said comparing step.

13. A method as claimed in claim 11, wherein said original image data is output from a networked video source.

14. A method as claimed in claim 11, wherein said moderated light source is a laser diode.

15. A method as claimed in claim 11 wherein said imaging parameters further comprise:

a) a magnitude of the electrostatic charge on the photoreceptor;

b) an intensity of light of said moderated light source; and c) a concentration of toner particles used to develop a latent image.

16. A circuit for generating process control patches having a variety of shapes and/or sizes an placing them at any location upon the surface of a photographic member, comprising:

a) means for storing a plurality of patch patterns in a computer memory, said patch patterns having a plurality of shapes and/or sizes;

b) means for inputting an original image into a printing system;

c) means for defining said original image as a set of electronic signals;

d) means for transmitting said image signals to an image control circuit;

e) means for choosing a patch pattern having a shape and size related to said electronic image signals;

f) means for accessing an address in a computer memory at which said chosen patch pattern is stored;

g) means for designating the location upon the surface of the photographic member at which said patch pattern is to be placed;

h) means for transmitting a set of signals representative of said patch pattern and location to said image control circuit;

i) means for collecting said patch pattern and patch location signals to form a control patch defined by a set of electronic signals;

j) means for selecting between said control patch signals and said original image signals for output and placement on the photoreceptor; and k) means for transmitting said selected output signals to a modulated light source.

17. A circuit as claimed in claim 16 further comprising:

a) means for measuring an electrostatic charge of the process control patch;

b) means for comparing said measured charge to a known charge for the process control patch; and c) means for adjusting a set of imaging parameters based upon said comparing step.

18. A circuit as claimed in claim 16, wherein said image data is output from a networked video source.

* * * * *